(No Model.)
J. H. STIGGLEMAN.
AUTOMATIC CORN DROPPER.
No. 378,808. Patented Feb. 28, 1888.
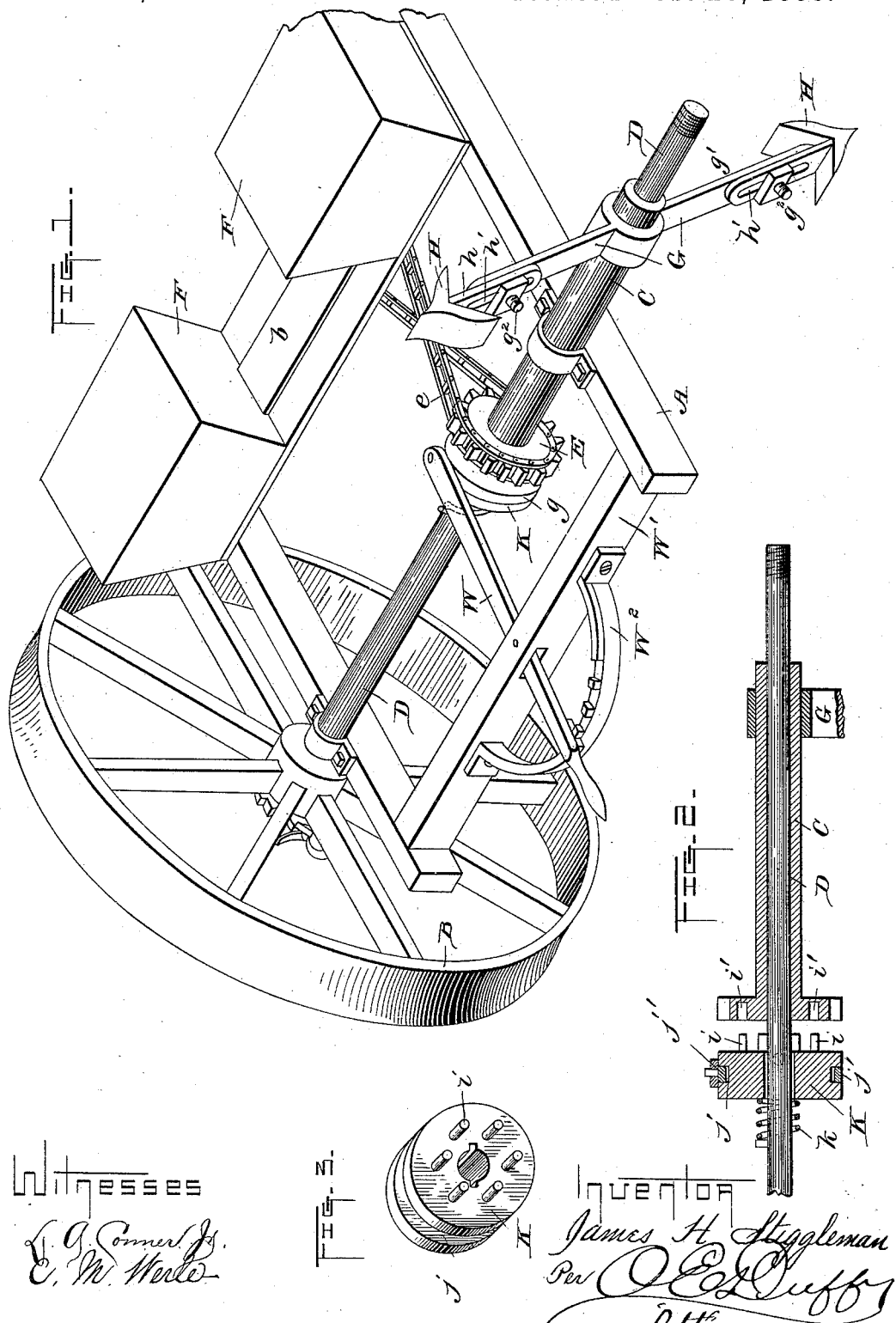
Witnesses
L. G. Conner Jr.
E. M. Werle
Inventor
James H. Stiggleman
Per C. E. Duffy
Attorney

UNITED STATES PATENT OFFICE.

JAMES H. STIGGLEMAN, OF LINCOLNVILLE, INDIANA, ASSIGNOR TO A. W. STRAUGHN, OF SAME PLACE.

AUTOMATIC CORN-DROPPER.

SPECIFICATION forming part of Letters Patent No. 378,808, dated February 28, 1888.

Application filed November 8, 1887. Serial No. 254,657. (No model.)

*To all whom it may concern:*

Be it known that I, JAMES H. STIGGLEMAN, of Lincolnville, in the county of Wabash and State of Indiana, have invented a certain new and useful Improvement in Automatic Corn-Droppers; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to an improvement in seed-planters, and more particularly to an improvement in markers to be preferably used in connection with the automatic corn-planter described in the patent to A. W. Straughn, No. 368,791, dated August 23, 1887.

The object of my invention is to provide a marker which can be thrown into and out of gear with the driving-shaft and be free to operate with the seed-slides independent of the driving-shaft, whereby the seed-slides and marker can be adjusted so that a hill can be dropped where desired and yet be correctly located by the markers; and my invention consists in certain novel features of construction and combinations of parts, more fully described hereinafter, and pointed out in the claims.

In the accompanying drawings, Figure 1 represents a perspective view of a corn-planter showing my invention, the sleeve carrying the marker and sprocket-wheel being geared to the driving-axle and one driving-wheel removed. Fig. 2 is a longitudinal section of a portion of the driving-axle, sleeve, and clutch, showing the sleeve out of gear with the driving-axle; and Fig. 3 is a perspective view of the clutch.

In the drawings, the reference-letter A represents the frame of a planter, to which is journaled in suitable bearings the main driving shaft or axle D. Upon the opposite ends of the driving-axle D are loosely mounted the driving-wheels B, which are connected with the axle by any suitable pawl-and-ratchet mechanism, so as to drive the axle when the machine is moved forward.

Seed-boxes F are carried by the forward portion of the frame A, and the flow of seed from the boxes is regulated by the seed-slide *f*. Loosely embracing the axle D, preferably upon the right-hand portion of the same, is a sleeve, C. The sprocket-wheel E is rigidly keyed upon the inner end of the sleeve C, and drives the seed-slide *f*, through the medium of a sprocket-chain, *e*. A marker, G, is rigidly secured upon the opposite end of the sleeve C, between the frame A and one of the driving-wheels B. The marker G consists of oppositely-located and laterally-extending arms *g g'*, upon the opposite ends of which are adjustably secured the colters H. These colters are provided with a shank portion, *h*, having a longitudinal slot, *h'*. The colters are secured to the ends of arms *g g'* by means of the bolts $g^2$, fixed to the arms and passing through the slots in the shanks of the colters, the shanks being movably clamped to the arms by means of nuts upon the outer ends of the bolts, whereby the colters are secured upon the ends of the arms in longitudinal adjustment, and their distance from the driving-shaft can be regulated to suit the condition of the ground.

The cutting or digging portion of the colters is preferably made V-shaped in form, as shown, as it has been found that colters of this shape make the best and most noticeable impression upon the ground.

A gear-clutch, K, is mounted upon the driving axle or shaft opposite the sprocket-wheel E, so as to rotate with said axle or shaft and have a limited sliding adjustment upon the same. The side face of the clutch adjoining the sprocket-wheel upon the sleeve C is provided with a series of laterally-projecting studs, *i*, which are adapted to enter corresponding recesses, *i'*, in the adjoining side of the wheel E, and thereby lock the sleeve E and the marker and sprocket-wheel carried thereby to rotate with the driving axle or shaft. The clutch is held in engagement with the sprocket-wheel by means of a coil or spring, *k*, upon the driving-axle, one end of the spring bearing against a stop upon the axle and its opposite end against the clutch, as shown. The periphery of the clutch is provided with an annular groove, *j*, which is intended to loosely receive a ring, $j'$, which is secured to an operating-lever, W. The clutch-operating lever W is pivoted to a sill, W', and is secured at one end to the ring $j'$, its opposite or handle end being confined in the notched yoke $W^2$.

By means of the lever W the clutch can be thrown out of engagement with the sleeve C and held by means of the notched yoke $W^2$; but as soon as the lever is released from the notched yoke the tension of the spring $k$ is exerted to throw the clutch into engagement with the sleeve again.

The apparatus is so geared that when the clutch is in engagement with the sleeve and the main driving-wheels have rotated one-half of their circumference the seed-boxes will drop two hills, and each hill will be marked by the marker, which rotates with the wheels, as will be readily seen without full description of the operation of the machine.

When the machine is to be started upon a new row, and it is seen that the seed-dropping apparatus will not drop a hill before some distance has been traveled upon the new row, and as it is always desired that the hills shall begin with the ends of the rows, and thus economize space, the operator should throw the clutch out of engagement with the sleeve and then rotate the sleeve by means of the marker, and thus operate the dropping apparatus, through the medium of the sprocket-wheel and chain, until it is seen that the seed-slide will allow the seed to fall immediately upon the forward movement of the machine when beginning upon the new row. It will thus be readily seen that the hills can be dropped at the beginning of every row, and thereby greatly economize space and improve the appearances of the field of grain, corn, or the like.

Having thus fully described my invention, what I claim, and desire to secure by Letters Patent of the United States, is—

1. In a seed-planter, the combination, with the driving shaft or axle and the seed-dropping mechanism, of a sleeve loosely embracing said axle, a sprocket-wheel keyed upon the inner end of the sleeve and connected with the dropping mechanism, a marker keyed to the opposite end of said sleeve, and a spring-actuated clutch keyed to the axle in sliding adjustment at the inner end of said sleeve, whereby the marker and dropping mechanism can be thrown in and out of gear with the driving-wheels, substantially as described.

2. In combination, a main driving shaft or axle, a sleeve loosely embracing said axle, a marker keyed to said sleeve, a gear-wheel keyed to the inner end of the sleeve and provided with a series of openings in its inner face, a clutch keyed to the axle in sliding adjustment at the inner end of the sleeve, projecting pins upon the side of the clutch to enter the openings in the gear-wheel, a spring to hold the clutch in engagement with the gear-wheel, and a lever pivoted to the clutch for operating the same, substantially as described.

3. The combination, with a main driving shaft or axle and a sleeve loosely mounted thereon, of a marker keyed to the outer end of the sleeve, said marker being composed of two oppositely-extending arms, and longitudinally-adjustable colters mounted upon the ends of said arms, said colters being provided with slotted shanks and having their cutting or digging portions V-shaped, as described.

4. In combination, a main driving shaft or axle, a seed-dropping mechanism, a sleeve loosely mounted on said shaft or axle, a marker keyed to the sleeve, a sprocket-wheel keyed upon the inner end of the sleeve, a sprocket-chain engaging said sprocket-wheel and operating the dropping mechanism, a clutch located on the axle opposite the inner end of the sleeve in sliding adjustment, a spring upon the axle and bearing against the clutch to hold it in engagement with the sleeve and sprocket-wheel, and a lever for operating said clutch, as set forth.

5. The combination, with the seed-dropping mechanism and a driving shaft or axle, of a rotary marker, consisting of oppositely-extending arms, longitudinally-adjustable colters carried upon the ends of the arms, said colters having slotted shanks and V-shaped cutting or digging edges, and bolts passing through said slotted shanks and adjustably clamping the colters to the arms, substantially as described.

In testimony that I claim the foregoing as my own invention I affix my signature in presence of two witnesses.

JAMES H. STIGGLEMAN.

Witnesses:
WARREN BIGLER,
JOHN H. DICKEN.